United States Patent [19]
Arai et al.

[11] Patent Number: 5,099,614
[45] Date of Patent: Mar. 31, 1992

[54] FLAT LAPPING MACHINE WITH SIZING MECHANISM

[75] Inventors: Hatsuyuki Arai, Zama; Misuo Sugiyama, Hadano, both of Japan

[73] Assignee: Speedfam Co., Ltd., Ayase, Japan

[21] Appl. No.: 91,438

[22] Filed: Aug. 31, 1987

[30] Foreign Application Priority Data

Sep. 1, 1986 [JP] Japan .................. 61-205569

[51] Int. Cl.$^5$ ............................................ B24B 49/00
[52] U.S. Cl. ......................... 51/165 R; 51/165.74; 51/283 R
[58] Field of Search ........... 51/165 R, 165.74, 165.76, 51/DIG. 11, 283 R; 73/597, 644

[56] References Cited

U.S. PATENT DOCUMENTS

| | | | |
|---|---|---|---|
| 2,525,861 | 10/1950 | Carlin | 73/644 |
| 2,796,702 | 6/1957 | Bodine | 51/317 X |
| 3,416,365 | 12/1968 | Frederick | 73/597 |
| 3,973,152 | 8/1976 | Karplus | 73/644 X |
| 4,195,530 | 4/1980 | Ross et al. | 73/644 X |
| 4,208,917 | 6/1980 | Aoyama et al. | 73/644 |
| 4,272,924 | 6/1981 | Masuko et al. | 73/597 X |
| 4,388,830 | 6/1983 | Narushima et al. | 73/597 |
| 4,649,749 | 3/1987 | Hazony et al. | 73/597 |
| 4,658,648 | 4/1987 | Roddeck et al. | 73/597 |

FOREIGN PATENT DOCUMENTS

2817247  11/1978  Fed. Rep. of Germany ........ 73/597

OTHER PUBLICATIONS

Portable Ultrasonic Thickness Gage, "Electronics" Jan., 1948, Norman Benson, pp. 88 thru 92.
"Ultrasonic Testing of Materials" Krautkramer et al. Third Edition Springer-Verlag Berlin Heidelberg New York, 1983.

Primary Examiner—M. Rachuba
Attorney, Agent, or Firm—Allegretti & Witcoff, Ltd.

[57] ABSTRACT

A flat lapping machine with an ultrasonic sizing mechanism for automatically lapping the work, such as a semiconductor wafer and a magnetic disk substrate, to the present desired thickness. The flat lapping machine permits high-precision thickness measurement or sizing and uniform work lapping by assuring stable propagation of ultrasonic waves by eliminating such noise-induced waveform disturbance as might occur when slurried abrasive is used as the propagation medium and such localized dilution of slurried abrasive as might occur when water is used as the propagation medium. The flat lapping machine may have a sizing mechanism for automatically lapping the work to the preset desired thickness based on the difference between the preset and measured thicknesses of the work. The machine comprises top and bottom rotatable lapping surface plates and a transducer attached to the top surface plate in a position opposite to the work to send out ultrasonic waves to the work to determine its thickness. An ultrasonic-wave propagation medium of such solid material as metal, glass or plastic is interposed between the transducer and the work.

5 Claims, 2 Drawing Sheets

FLAT LAPPING MACHINE WITH SIZING MECHANISM

BACKGROUND OF THE INVENTION

This invention relates to a flat lapping machine with an ultrasonic sizing mechanism that automatically laps the work to the preset desired thickness.

As prior art, FIG. 6 shows a known type of flat lapping machine that laps the work, such as a semiconductor wafer and magnetic disk substrate, with two surface plates at the top and bottom. As illustrated, an ultrasonic transducer 1 is affixed through a holder 2 to the top surface plate 3 in a position opposite to the work 4. Sizing is done on the basis of the thickness of the work 4 determined from the time passed before the echo of pulses of ultrasonic waves sent out from the transducer 1 to the work 4 is received.

In this known type of flat lapping machine, the transducer 1 is affixed in one of the slurried-abrasive feed holes provided in the top surface plate 3 by means of the holder 2. The transducer 1 is somewhat recessed from the bottom surface of the top surface plate 3, with provision being made to fill a space 5 left between the transducer 1 and the work 4 with slurried abrasive that serves as a propagation medium for ultrasonic waves fed through an inlet 7. Particles of the abrasive contained in the slurry, however, often disturb the waveform of the ultrasonic echo to such an extent as to produce errors in thickness measurement, preventing the achievement of high-precision sizing.

A known solution for the above problem is to affix the transducer in a position different from the slurried-abrasive feed hole using the same method as the one shown in FIG. 6. To ensure that the echo waveform is not disturbed, water containing no abrasive particles is fed through the inlet 7 as the propagation medium. This method, known as the water-immersion method, is one of basic ultrasonic flow detecting techniques offering an advantage of high-precision measurement because of the undistrubed echo waveform.

If this technique is applied just as it stands to the sizing in flat lapping machines, however, some portion of the slurried abrasive may get diluted because of the localized feed of water, which may in turn cause non-uniform lapping of the work, seriously impairing the finishing accuracy of the work.

SUMMARY OF THE INVENTION

A first object of this invention is to achieve high-precision ultrasonic thickness measurement and sizing of the work by assuring stable propagation of ultrasonic waves and eliminating such noise-induced disturbance of echo waveforms as might occur when slurried abrasive is used as the propagation medium.

A second object of this invention is to achieve uniform lapping by improving the sizing and working accuracy of the work by eliminating such localized dilution of slurried abrasive as might occur when water is used as the propagation medium for ultrasonic waves.

The invention comprises a flat lapping machine with a sizing mechanism that comprises top and bottom surface lapping plates and a transducer affixed to one of the plates in a position opposite to the work to be lapped, to send out ultrasonic waves to the work to determine the thickness thereof. The device of the invention may automatically lap the work to a preset, desired thickness on the basis of automatically eliminating the difference between a desired setting and the obtained measurement. This invention achieves the aforementioned objects by providing a characteristic ultrasonic-wave propagation medium consisting of a solid material such as metal, glass or plastic between the transducer and work.

In the flat lapping machine just described, the work is placed between and lapped by the rotary surface plates at the top and bottom.

The transducer sends out ultrasonic waves to the work and receives the echo returned therefrom. The thickness of the work is determined, based on the received echo signal. Then, the work is automatically lapped to the preset desired thickness, based on the difference between the desired setting and obtained measurement. The solid propagation medium such as metal, glass or preferably rigid plastic assures highly stable propagation of ultrasonic waves. The solid medium is free from such noise-induced waveform disturbance as might occur when slurried abrasive is used as the propagation medium and such localized dilution of slurried abrasive as might occur when water is used as the propagation medium. The result is highly accurate sizing, uniform lapping and high-precision finishing.

DESCRIPTION OF THE PREFERRED EMBODIMENT

Figure 1:
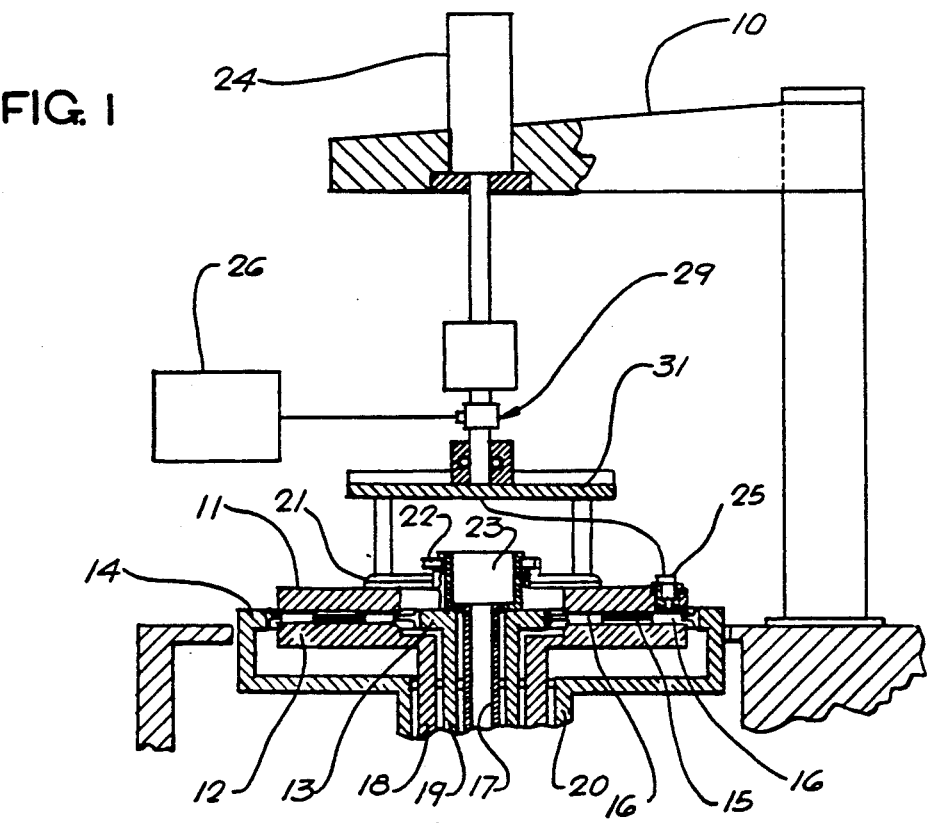
FIG. 1 is a cross-sectional view showing the principal parts of a preferred embodiment of this invention.

A flat lapping machine shown in FIG. 1 comprises rotatable top and bottom surface plates 11 and 12, a sun gear 13 and an internal gear 14. A carrier 15 driven by the two gears 13 and 14 disposed like a planetary gear train holds the work 16 in position so as to be lapped by the top and bottom surface plates 11 and 12. A power source not shown drives the surface plates 11 and 12 and gears 13 and 14 through coaxially disposed drive spindles 17 to 20. A cylinder 24 attached to a frame 10 elevatably suspends the top surface plate 11. The top surface plate 11 is driven by a driver 23 at the top of the driven spindle 17 that comes into engagement with a claw 22 on a fitting plate 21 in a lowered position.

Figure 2:
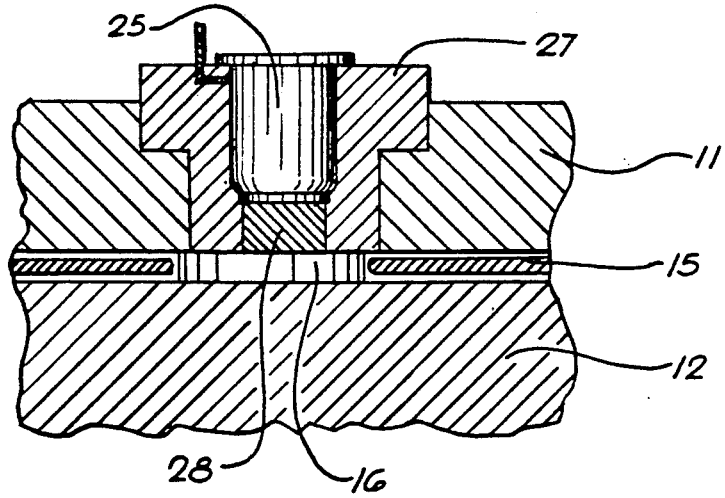
FIG. 2 is a partial, enlarged, sectional view of FIG. 1.

A transducer 25 transmitting and receiving ultrasonic waves and their echoes and making up a sizing mechanism together with a control unit 26 is attached to the top surface plate 11. As is elaborated in FIG. 2, the transducer 25 is attached to the top surface plate 11 in a position somewhat recessed from the bottom surface thereof, by means of cylindrical holder 27, and opposite to the work 16. An ultrasonic-wave propagation medium 28 consisting of such solid material as metal, glass or preferably-rigid plastic is placed in a space left between the transducer 25 and the bottom surface of the top surface plate 11 or the work 16. The bottom surface of the holder 27 and propagation medium 28 are flush with the lapping face of the top surface plate 11. For example, propagation medium 28 may be made of quartz.

The control unit 26 is electrically connected to the transducer 25 through a rotary joint 29 consisting of a brush and a slip ring, as shown in FIG. 1. The control unit 26 transmits and receives ultrasonic waves and their echoes through the transducer 25, determines the thickness of the work 16 based on the signals reflected therefrom, displays the result of comparison between the actually measured thickness of the work 16 and the preset desired finishing thickness, and controls the motion of the flat lapping machine so that the work is finished to the preset thickness based on the result of such comparison.

Figure 3:
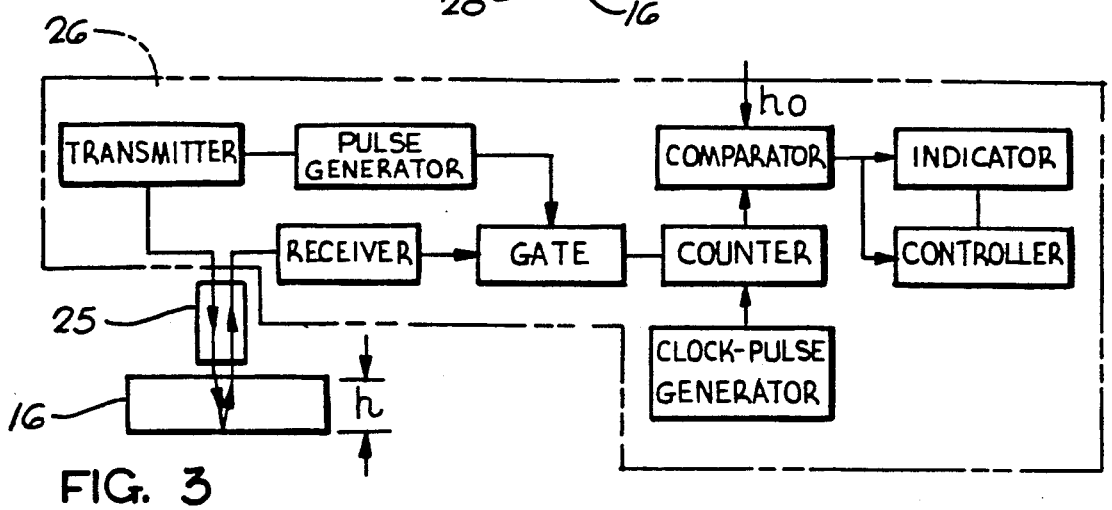
FIG. 3 is a block diagram showing an example of the structure of a control unit.

FIG. 3 shows an example of the control unit 26 whose structure and operation are as follows: The control unit 26 has a transmitter and a receiver that sends out ultrasonic waves and receives their echoes through the transducer 25. A pulse signal from a pulse generator actuates the transmitter to send out pulses of ultrasonic waves to the work 16 through the transducer 25. Then, echo waves reflected by the top and bottom surfaces of the work 16 are received by the receiver. The received signal contains a top-surface echo pulse $P_1$ reflected from the top surface of the work and a bottom-surface echo pulse $P_2$ reflected from the bottom surface thereof, as shown at (a) in FIG. 4. The received signal is then input into a counter through a gate, as in FIG. 3.

Figure 4:
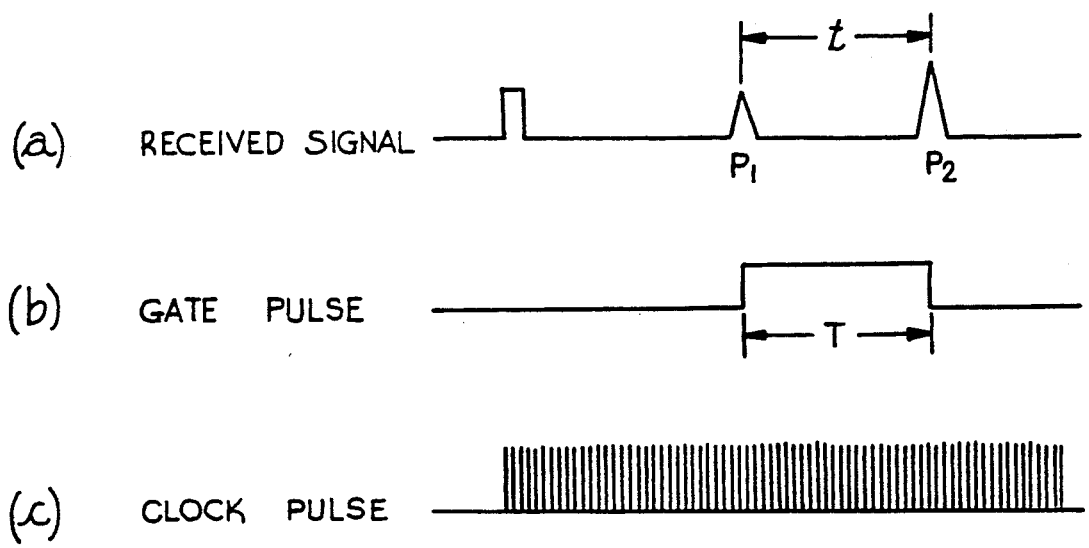
FIGS. 4 (*a*) to (*c*) illustrate waveforms of different signals.

A gate pulse (shown at (b) in FIG. 4) from the pulse generator opens the gate for a given time T to transmit said received signal to the counter.

The counter determines the difference t between the travel time of the top-surface echo pulse $P_1$ and the travel time of the bottom-surface echo pulse $P_2$ by counting clock pulses (shown at (c) in FIG. 4) successively generated by a clock-pulse generator (FIG. 3) at given time intervals. The obtained time difference t is input into a comparator, also shown in FIG. 3.

The comparator derives the thickness h of the work from the time difference t using the following equation:

$$h = \tfrac{1}{2} t \times V$$

where V=travel speed of the ultrasonic waves in the work

The obtained thickness h is compared with the preset desired finishing thickness $h_0$, at the comparator. When the measured thickness h of the work 16 becomes equal to the preset value $h_0$, or when the difference between the measured and preset values becomes 0, a stop signal is sent to a control to stop the motion of the flat lapping machine. The results of comparison are indicated at a display one after another.

The first bottom-surface echo reflected first by the bottom surface of the work and a second or subsequent bottom-surface echo reflected by the same bottom surface after making a return trip through the work may be used for the determination of the work thickness instead of said top and bottom-surface pulses.

On the flat lapping machine just described, the work 16 held by the carrier 15 is lapped by the top and bottom surface plates 11 and 12 in the same manner as with a flat lapping machine of the known type. The desired finishing thickness of the work 16 is preset in the control unit 26 of the sizing mechanism.

The thickness of the work 16 decreasing with the progress of lapping is continuously measured by sending out ultrasonic waves from the transducer 25 to the work 16 as described before. The control unit 26 sends a stop signal to the flat lapping machine to stop lapping when the difference between the measured and preset values becomes 0. The work 16 is thus automatically lapped to the preset desired thickness.

Travelling through the propagation medium 28 of solid material, the ultrasonic waves sent out from the transducer 25 to the work 16 propagate stably, scarcely creating noise-induced waveform disturbance.

Figure 5:
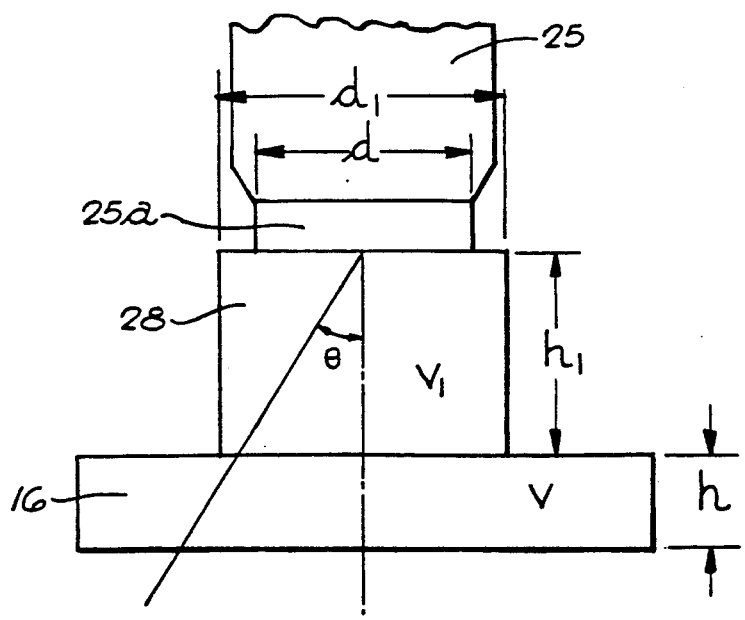
FIG. 5 is a more detailed view of the principal parts shown in FIG. 2.
Figure 6:
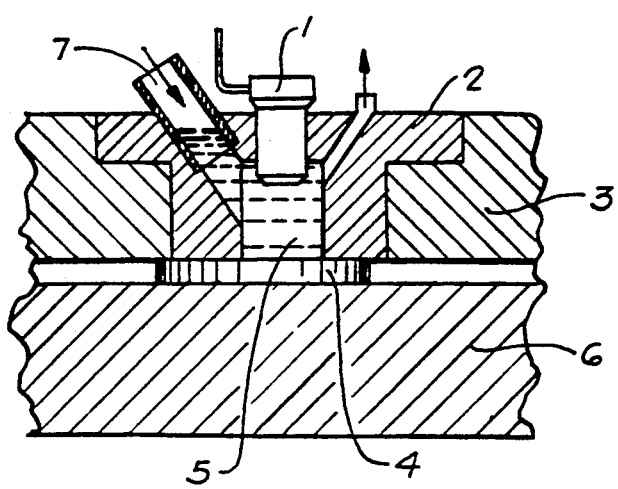
FIG. 6 is a partial cross-sectional view of a prior art structure.

Various kinds of materials may be used as the propagation medium 28. The ratio of acoustic impedance between the medium and the oscillator 25a (FIG. 5) of the transducer 25, the same ratio between the medium and the work 16, the attenuation of ultrasonic waves within the propagation medium 28, the frequency generated by the oscillator 25a, the reciprocal transmission coefficient of sound pressure, and other factors may be taken into consideration for most effective use of this invention. However, it has been empirically established that the best result is obtainable with a medium whose acoustic impedance $Z1(\times 10^6 \text{ kg/m}^2\text{s})$ comes within the range of 1 to 20 ($1 < Z < 20$).

Because the thickness of the work 16 is usually measured using the top-surface echo to the fourth bottom-surface echo, the propagation medium in that circumstance should preferably have such thickness $h_1$ as will satisfy the following equation (see FIG. 5):

$$\frac{h_1 - n}{h \times 4} = \frac{V_1}{V}$$

where
$V_1$=velocity of ultrasonic waves in the medium;
$V$=velocity of ultrasonic waves in the work;
$h_1$=thickness of wave propagation medium 28;
$h$=thickness of the work; and
$n$=depth of hydrodynamic relief grooves present in the top surface plate 11. If none are present $n=0$.

Meanwhile, the diameter $d_1$ of the propagation medium 28 should preferably satisfy the following known equations in view of the attenuation of ultrasonic waves in the medium, the elimination of transverse waves detrimental to measurement, and other factors:

$$\theta = 70 \times \frac{V_1}{d \cdot f}$$

$$d_1 = 2h_1 \cdot \tan \theta$$

where
$d$=diameter of the oscillator 25a;
$f$=frequency generated by the oscillator 25a; and
$\theta$=angle of directional transmission.

In the preferred embodiment just described, the transducer 25 and control unit 26 are connected together by means of the rotary joint 29 consisting of a brush and a slip ring. Also, non-contact connection can be established between the transducer 25 and the control unit 26 by mounting a solar cell on a suspension plate 31 or other member that rotates integrally with the top surface plate 11 and exchanging signals therebetween by radio transmission.

The above has been offered for illustrative purposes only and is not intended to limit the scope of the invention, which is as defined in the claims below.

What is claimed is:

1. In a flat lapping machine with a sizing mechanism for automatically lapping a plurality of workpieces to a predetermined thickness, the improvement comprising, in combination, an upper rotatable lapping plate, a lower rotatable lapping plate, a workpiece carrier disposed between said upper and lower rotatable lapping plates for holding a plurality of workpieces in engagement with both said upper and lower lapping plates for lapping the top and bottom surfaces of said workpieces, a transducer fixedly mounted in said upper lapping plate substantially outwardly from the center thereof for rotation with said upper lapping plate, said transducer being directed downwardly to transmit ultrasonic waves to said workpieces as said workpieces are moved seriatim beneath said transducer for determining the thickness of said workpieces, and an ultrasonic wave propagation medium of solid material mounted in said upper lapping plate between said transducer and said workpieces as the latter pass seriatim beneath said transducer, said propagation medium of solid material having an upper surface positioned substantially immediately beneath said transducer and having a lower surface substantially flush with the bottom surface of said upper lapping plate whereby said propagation medium of solid material and said bottom surface of said upper lapping plate will both contact said workpieces as they pass therebeneath.

2. In a flat lapping machine as defined in claim 1 including a holder fixedly mounted in an opening through said upper lapping plate, said holder having a vertical opening therethrough, said transducer being fixedly mounted in said holder with its lower end recessed above the bottom surface of said upper lapping plate, and said propagation medium of solid material being mounted in said holder substantially immediately beneath said transducer with the lower surface of said propagation medium being substantially flush with said bottom surface of said upper lapping plate whereby said propagation medium approximately contacts the bottom of said transducer and contacts workpieces as they pass seriatim beneath said transducer thereby substantially filling the space between said transducer and said workpieces as each workpiece passes beneath said transducer.

3. In a flat lapping machine as defined in claim 2 where said holder is cylindrical and the lower end of said holder is substantially flush with both said lower surface of said propagation medium and said bottom surface of said upper lapping plate.

4. In a flat lapping machine as defined in claim 3 where said propagation medium is glass.

5. In a flat lapping machine with a sizing mechanism for automatically lapping a plurality of workpieces to a predetermined thickness, the improvement comprising, in combination, an upper rotatable lapping plate, a lower rotatable lapping plate, a workpiece carrier disposed between said upper and lower rotatable lapping plates for holding a plurality of workpieces in engagement with both said upper and lower lapping plates for lapping the top and bottom surfaces of said workpieces, a cylindrical opening extending through said upper lapping plate adjacent a radially outer portion thereof, a cylindrical holder fixedly mounted in said opening with a lower end thereof substantially flush with a bottom surface of said upper lapping plate, a transducer fixedly mounted in said holder with the lower end of said transducer recessed above said lower end of said holder, and an ultrasonic wave propagation medium of solid material mounted in said opening in said holder with the upper end thereof in substantial contact with the lower end of said transducer and the lower end of said propagation medium substantially flush with said bottom surface of said upper lapping plate whereby said propagation medium and said bottom surface of said upper lapping plate will both contact said workpieces as they pass therebeneath, said transducer thereby substantially filling the space between said transducer and said workpieces as each workpiece passes beneath said transducer.

* * * * *